March 18, 1969  H. C. SWIFT  3,433,333

ADJUSTING MEANS FOR DISK BRAKES

Original Filed Feb. 17, 1966

INVENTOR.
Harvey C. Swift
BY
Harness, Dickey & Pierce
ATTORNEYS

United States Patent Office 3,433,333
Patented Mar. 18, 1969

3,433,333
ADJUSTING MEANS FOR DISK BRAKES
Harvey C. Swift, Birmingham, Mich., assignor to Kelsey-Hayes Company, a corporation of Delaware
Original application Feb. 17, 1966, Ser. No. 528,247, now Patent No. 3,365,029, dated Jan. 23, 1968. Divided and this application Dec. 15, 1967, Ser. No. 690,821
U.S. Cl. 188—196        7 Claims
Int. Cl. F16d 65/38, 55/00, 65/14

ABSTRACT OF THE DISCLOSURE

A disk brake assembly incorporating an automatic adjusting device for taking up wear in the frictional linings of the brake pads. The automatic adjusting device is an extensible assembly that is interposed between the actuating piston of the brake assembly and a pivotally supported lever, which lever may also be used for manual operation of the brakes. The extensible assembly includes a serrated ratchet mechanism that permits elongation of the assembly upon excessive wear of the brake lining but which precludes compression or shortening of the member when it experiences a brake acutating force.

Background of the invention

This application is a division of my application of the same title, Ser. No. 528,247, filed Feb. 17, 1966 and assigned to the assignee of this application, now Patent No. 3,365,029.

This invention relates to brakes of the disk type and more particularly to an improved automatic adjusting device for such brakes.

It is an object of this invention to provide a hydraulically operated disk brake having a mechanically operated parking or emergency brake combined therewith in such a manner that each brake actuating mechanism may be operated independently of the other and wherein the combined brakes and actuating means therefor are consolidated and assembled into a unit which may be economically manufactured, quickly and easily assembled and installed, and in which maintenance costs are reduced to a minimum.

Another object of the invention is to provide a mechanical brake actuating means which is associated with the hydraulically operated portion of the brake in such a manner that the same brake actuating piston may be employed for actuating the brakes both hydraulically and mechanically.

Another object of the invention is to provide means, operable when the brake is actuated hydraulically, to adjust the position of the brake actuating piston to compensate for wear on the brake shoe linings.

Summary of the invention

An automatic adjusting device embodying this invention is particularly adapted for compensating for wear of the frictional lining of a brake shoe or the like. The adjusting device includes a lever that is adapted to operatively engage the brake shoe and which lever is supported for pivotal movement about a pivot axis. An actuating means is provided for pivoting the lever about the pivot axis for selectively actuating the brake shoe. Means automatically move the pivot axis of the lever in the direction of actuating movement of the brake shoe upon a predetermined degree of wear of the frictional lining of the shoe to maintain substantially the same brake pedal travel regardless of the dgeree of wear of the lining.

The means for automatically moving the pivot axis described in the preceding paragraph may comprise a sleeve that is formed with a serrated internal bore and which defines the pivot axis. A fixed reaction member extends into the bore and a serrated locking member is supported within the bore and is interposed between the reaction member and the serrations of the bore. First biasing means yieldably urge the serrations of the locking member into engagement with the serrations of the bore for precluding relative movement between the sleeve and the reaction member in a first direction. Second biasing means are interposed between the sleeve and the reaction member for urging the sleeve in a direction opposite to to the first mentioned direction for compensating for wear in the frictional lining of the brake shoe upon yielding of the first biasing means to effect disengagement of the serrations of the locking member from those of the bore.

Detailed description of a preferred embodiment

Figure 1:
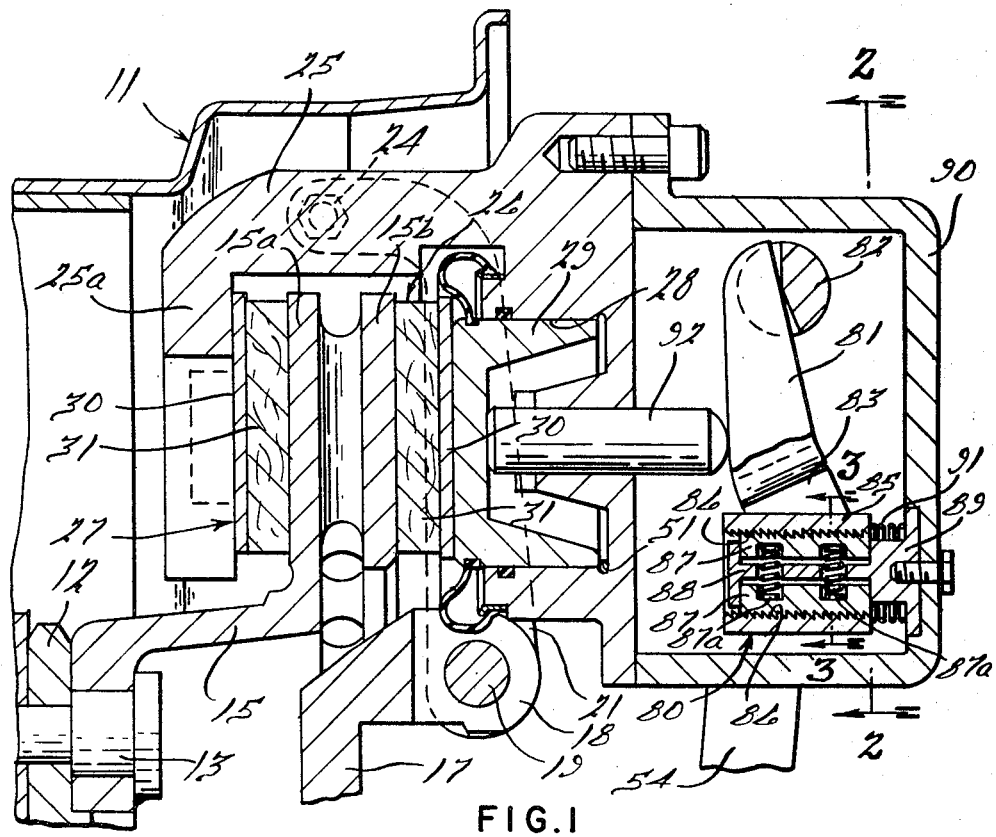
FIGURE 1 is a fragmentary sectional view through a disk brake constructed in accordance with this invention, with a portion of the wheel indicated in full lines.
Figure 2:
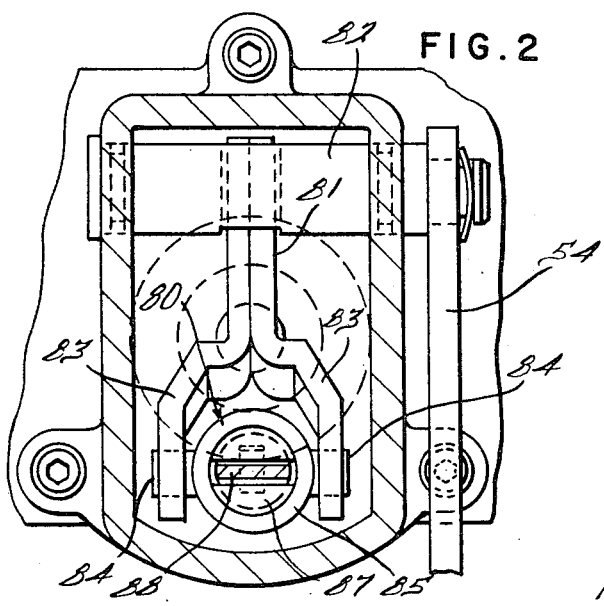
FIGURE 2 is a sectional elevational view taken substantially on the plane indicated by line 2—2 in FIGURE 1.
Figure 3:
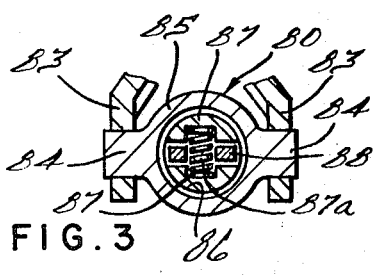
FIGURE 3 is a detail sectional view taken on line 3—3 in FIGURE 1.

The brake of this invention is illustrated in FIGURES 1, 2 and 3 and is shown as being associated with a vehicle wheel body 11 secured to the axle flange 12 by means of studs or bolt and nut assemblies 13. Also secured to the axle flange 12, as for instance by means of the same studs or bolt and nut assemblies 13 for rotation with the body 11, is a brake disk 15. The brake disk 15 is of the ventilated type having spaced walls 15a and 15b.

Secured to a fixed part of the axle structure (not shown) in any known manner, is a torque member 17. Attached to the torque member 17 are spaced sleeve-like members 18 through which a shaft or rod 19 extends. A spacer sleeve (not shown) is positioned on rod 19 between the sleeves 18. The reference character 21 indicates a pair of links rotatably journaled along the shaft or rod 19. These links are freely rotatable on the shaft or rod 19 and the upper free end of each member 21 is freely journaled as at 24 to a caliper-like member 25 which straddles a portion of the periphery of the brake disk 15. The pivotal supports 24 for the caliper-like member 25 are independent of one another so that independent pivotal movement of the caliper-like member 25 on the pivots 24 is possible. The pivotal supports 24 are in alignment with one another transversely of the caliper-like member 25 and are preferably arranged in radial alignment with the periphery or the rotor or brake disk, whereby the caliper 25 is pivotally supported equidistant from braking surfaces of the braking disk. The details of construction just described are shown more fully in my copending application Ser. No. 514,345, filed Dec. 16, 1965, now U.S. Letters Patent No. 3,331,472, issued July 18, 1967.

One leg of the caliper 25 is provided with a recess 28 forming a cylinder to slidably receive a piston 29. When fluid under pressure is admitted to the recess 28 the piston 29 is moved to the left, as viewed in FIGURE 1, and engages the adjacent brake shoe 26 to move it against the rotor or brake disk 15. The reaction of the movement of the piston operates in an opposite direction to move the caliper 25 so that the other end 25a of the caliper moves against a brake shoe 27 to force the same into engagement with the brake disk 15. Thus, both brakes are actuated simultaneously by the use of a single piston. Each brake shoe is provided with a backing plate 30 carrying a friction lining 31 adapted to engage the braking surfaces 15a and 15b of the brake disc 15.

The brake shoes may be operated either hydraulically or manually as shown in FIGURE 1. For hydraulic operation, fluid will be admitted behind the piston 29 through an inlet 51. The brakes may also be operated manually by means contained within a housing 90. The manually controlled means is shown as comprising an operating lever 54 which may be connected by a link or the like (not shown) to an operating handle (not shown). The lever 54 is connected to a cam shaft 82 having a cam surface that engages the free end of a lever 81. The other end of the lever 81 is bifurcated, as at 83, and is pivotally mounted on projections 84 that are supported within the housing 90 in a manner to be described. Movement of the lever 81 to the left, as seen in FIGURE 1, will be transmitted through a plunger 92 that, in turn, engages the piston 29.

The pivotal support for the lever 81 and particularly the projections 84 are supported by an extensible member 80. The projections 84 extend from an outer sleeve 85 of the extensible member 80, see FIGURE 3. The interior of the sleeve 85 is formed with abutment-type threads or teeth 86 which engage similar abutment-type teeth or threads on a pair of segments 87 urged radially outwardly by springs 87a. The segments 87 are carried by an arbor-like member 88 which is carried by a supporting member 89 secured to the housing 90 which houses the lever 81 and the extensible member 80. Arranged between the sleeve member 85 and the supporting member 89 is a spring 91.

The spring 91 normally urges the sleeve 85 carrying the pivots 84 to the left as seen in FIGURE 1 but there will be no movement of the pivots 84 of the lever 81 so long as the parts are in the position illustrated in FIGURE 1. However, if the movement of the piston 29 is such, due to wear on the brake linings 31, that the piston 29 moves away from the plunger 92, the spring 91 will move the sleeve member 85 one tooth space to the left and thus move the pivots 84 of the lever 81 to the left to bring the parts back to the position illustrated in FIGURE 1. Therefore, this automatic adjustment of the position of the pivots 84 will maintain the lever 81 in engagement with plunger 92 so that the brake will always be capable of manual operation and so that the brake shoes 26 and 27 are moved the same distance during hydraulic actuation regardless of the degree of wear of the linings 31.

While a commercially practical embodiment of the invention has been described and illustrated herein somewhat in detail, it will be understood that various changes may be made as may come within the purview of the accompanying claims.

What is claimed is:

1. An automatic adjusting device for compensating for the wear of the frictional lining of a brake shoe or the like comprising a lever adapted to operatively engage the brake shoe, means for supporting said lever for pivotal movement about a pivot axis, actuating means for pivoting said lever about said pivot axis for selectively actuating the brake shoe, means for automatically moving said pivot axis in the direction of actuating movement of the brake shoe upon a predetermined degree of wear of the frictional lining of the brake shoe, and means for actuating said brake shoe independently of said lever, said lever being operatively associated with the last named means for actuating the brake shoe through said last named means upon pivotal movement of said lever.

2. An automatic adjusting device as set forth in claim 1 wherein the last named means comprises a hydraulically operated piston.

3. In a disk brake including a disk and a friction pad supported for movement into and out of engagement with said disk, the improvement comprising a lever adapted to operatively engage said friction pad for moving said friction pad into and out of its engagement with said disk, means for supporting said lever for pivotal movement about a pivot axis, actuating means for pivoting said lever about said pivot axis for selectively actuating said friction pad, means for automatically moving said pivot axis in the direction of actuating movement of said friction pad upon a predetermined degree of wear of the frictional lining of said friction pad, and a hydraulically actuated piston operatively engaged with said brake pad for actuation of said brake pad independently of said lever, said lever being engaged with said piston for actuating said brake pad through said piston upon pivotal movement of said lever.

4. An automatic adjusting device for compensating for the wear of the frictional lining of a brake shoe or the like comprising a lever adapted to operatively engage the brake shoe, means for supporting said lever for pivotal movement about a pivot axis, actuating means for pivoting said lever about said pivot axis for selectively actuating the brake shoe, means for automatically moving said pivot axis in the direction of actuating movement of the brake shoe upon a predetermined degree of wear of the frictional lining of the brake shoe, the means for automatically moving the pivot axis in the direction of actuating movement of the brake shoe comprising a sleeve defining pivot means, said lever being pivotally supported upon said pivot means whereby said pivot means defines the pivot axis, said sleeve being formed with a serrated internal bore, a fixed reaction member extending into said bore, a serrated locking member supported within said bore and interposed between said reaction member and the serrations of said bore, biasing means interposed between said reaction member and said locking member for yieldably urging the serrations of said locking member into engagement with the serrations of said bore for precluding relative movement between said sleeve and said reaction member in a direction opposite to the direction of actuating movement of the brake shoe, and coil spring means encircling a portion of said reaction member and engaging said sleeve and said reaction member for urging said sleeve in the direction of actuating movement of the brake shoe, said biasing means being adapted to yield upon a predetermined wear of the lining of the brake shoe for movement of said sleeve relative to said reaction member in the direction of actuating movement of the brake shoe.

5. An automatic adjusting device for compensating for the wear of the frictional lining of a brake shoe or the like comprising a sleeve adapted to operatively engage a brake component for adjusting the retracted position of the associated brake shoe, said sleeve being formed with a serrated internal bore, a fixed reaction member extending into said bore, a serrated locking member supported within said bore and interposed between said reaction member and the serrations of said bore, first biasing means for yieldably urging the serrations of said locking member into engagement with the serrations of said bore for precluding relative movement between said sleeve and said reaction member in a first direction, and second biasing means interposed between said sleeve and said reaction member for urging said sleeve in a direction opposite to said first direction upon a predetermined degree of wear of the frictional lining of the brake shoe.

6. An automatic adjusting device as set forth in claim 5 wherein the reaction member has a first portion that extends into the bore and a second position juxtaposed to one end of the sleeve, the second biasing means comprising coil spring means encircling said first portion of said reaction member and interposed between said second portion of said reaction member and said one end of said sleeve, the first biasing means being interposed between said first portion of said reaction member and said locking member.

7. An automatic adjusting device as set forth in claim 6 wherein the sleeve further includes pivot pin means extending outwardly of said sleeve for pivotally supporting a lever of the associated brake.

References Cited

UNITED STATES PATENTS

| 433,412 | 7/1890 | Lawrence | 188—196 X |
| 2,886,145 | 5/1959 | Vaught et al. | 188—196 X |
| 3,338,355 | 8/1967 | Kyllonen | 188—202 |

DUANE A. REGER, *Primary Examiner.*

U.S. Cl. X.R.

188—73, 106